United States Patent
May (10) Patent No.: US 12,101,231 B1
(45) Date of Patent: Sep. 24, 2024

(54) SYSTEMS AND METHODS FOR AUTOMATED INCIDENT MANAGEMENT

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/208,395

(22) Filed: Jun. 12, 2023

(51) Int. Cl.
*H04L 41/16* (2022.01)
*G06N 20/00* (2019.01)

(52) U.S. Cl.
CPC .............. *H04L 41/16* (2013.01); *G06N 20/00* (2019.01)

(58) Field of Classification Search
CPC ......... H04L 41/16; G06N 20/00; G06N 20/10
See application file for complete search history.

(56) References Cited

U.S. PATENT DOCUMENTS

| | | |
|---|---|---|
| 9,231,962 B1 | 1/2016 | Yen et al. |
| 11,075,951 B1 * | 7/2021 | Kats .................. H04L 63/20 |
| 2018/0164781 A1 * | 6/2018 | Kubo ................. G05B 19/4083 |
| 2019/0260804 A1 * | 8/2019 | Beck .................. H04L 63/1483 |
| 2021/0174195 A1 * | 6/2021 | Krishnan .................. G06N 7/01 |
| 2022/0083900 A1 * | 3/2022 | Khanna .................. G06F 17/18 |
| 2022/0294715 A1 * | 9/2022 | Agrawal ................. H04L 43/04 |
| 2023/0034173 A1 * | 2/2023 | Russell .................. G06N 20/00 |
| 2023/0065845 A1 * | 3/2023 | Patti ...................... G06F 11/366 |
| 2023/0162058 A1 * | 5/2023 | Kumar ..................... G06N 5/04 706/50 |
| 2023/0216766 A1 * | 7/2023 | Lukens .................. G06N 3/088 709/224 |

OTHER PUBLICATIONS

Sun et al., "Neighborhood Formation and Anomaly Detection in Bipartite Graphs", 2005, pp. 1-8.

* cited by examiner

*Primary Examiner* — Jonathan A Bui
(74) *Attorney, Agent, or Firm* — Jaffery Watson Hamilton & DeSanctis LLP (57) ABSTRACT

Systems, devices, and methods are discussed for automating incident management.

20 Claims, 7 Drawing Sheets

---

Incident Management System Executing an Automated Incident Identification and Response Application
140

- Incident and Playbook Database Access Module 141
- Playbook Machine Learning Model Application Module 144
- Action Application Module 147
- Network Status and Activity Monitoring Module 142
- Action Vector Assembly Module 145
- User Interface Module 148
- Occurrence Vector Assembly Module 143
- Action Machine Learning Model Application Module 146

SYSTEMS AND METHODS FOR AUTOMATED INCIDENT MANAGEMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2023, Fortinet, Inc.

FIELD

Embodiments discussed generally relate to network monitoring, and more particularly to systems and methods for automating incident management.

BACKGROUND

Network incident detection and management is typically a highly manual process with a human operator reviewing occurrences on a network, and from the occurrences determining that an actionable incident has occurred. Once an actionable incident is identified, one or more actions may be taken by the human operator to address the incident. Such reliance on operator interaction can result in increased costs and even missing one or incidents.

Thus, there exists a need in the art for more advanced approaches, devices and systems for automating network incident management.

SUMMARY

Various embodiments provide systems and methods for automating incident management.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for automating network management.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another.

Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical al sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which example embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for automatically generating playbooks in a networking environment. Such methods include applying, by a processing resource, a first machine learning model to an occurrence vector to yield one or more playbooks, where the occurrence vector includes at least a first occurrence and a second occurrence. The first machine learning model is trained using an incident and playbook database including at least: a first incident and a corresponding first playbook, where the first incident includes at least a first occurrence and a second occurrence and the first playbook includes at least a first action and a second action; and a second incident and a corresponding second playbook, where the second incident includes at least a third occurrence and a fourth occurrence and the second playbook includes at least a third action and a fourth action.

The methods further include: assembling, by the processing resource, an action vector, where the action vector includes at least the first action, the second action, the third action, and the fourth action; applying, by the processing resource, a second machine learning model to a combination of the occurrence vector and the action vector to yield one or more actions, wherein the second machine learning model is trained using the incident and playbook database; and applying, by the processing resource, a subset of the one or more actions to address an incident corresponding to the occurrences in the vector of occurrences.

In some cases, the first action is one of a device modification action, a network preclusion action, or a network modification action. In some cases, the first occurrence is a network traffic occurrence, a device status occurrence, or a network rules violation occurrence.

In some instances of the aforementioned embodiments, including the first action, the second action, the third action, and the fourth action in the action vector is based at least in part on the first machine learning model indicating that both the first playbook and the second playbook are reasonably likely to be applicable to the occurrences in the occurrence vector. In various instances of the aforementioned embodiments, the methods further include: comparing, by the processing resource, a likelihood that the first playbook is applicable to the occurrences in the occurrence vector to a threshold value; and comparing, by the processing resource, a likelihood that the second playbook is applicable to the occurrences in the occurrence vector to the threshold value. In such instances, including the first action, the second action, the third action, and the fourth action in the action vector is based at least in part on the likelihood that: the first playbook is applicable to the occurrences in the occurrence vector is greater than the threshold value, and the second playbook is applicable to the occurrences in the occurrence vector is greater than the threshold value.

In various instances of the aforementioned embodiments, the methods further include monitoring, by the processing resource, some combination of network activity, network status, and device status to identify the first occurrence and the second occurrence. In some cases, the methods further include: assembling, by the processing resource, the first occurrence and the second occurrence into the occurrence vector.

In some instances of the aforementioned embodiments, the methods further include: removing, by the processing resource prior to applying the second machine learning model, at least one action from the action vector where the at least one action is a duplicate of another action in the action vector. In various instances of the aforementioned embodiments, the methods further include: querying, via a user interface of the processing resource, a human user about the result of applying the subset of the one or more actions. In some such instances, the methods further include: creating, by the processing resource, a new incident from the occurrences in the occurrence vector and a new playbook including the subset of the one or more actions; and updating, by the processing resource, the incident and playbook database to include the new incident and the corresponding new playbook.

Other embodiments provide systems for providing access to virtual resources in a network environment. Such systems include a processing resource and a non-transitory computer-readable medium. The non-transitory computer readable medium is coupled to the processing resource and has stored therein instructions that when executed by the processing resource cause the processing resource to: apply a first machine learning model to an occurrence vector to yield one or more playbooks. The occurrence vector includes at least a first occurrence and a second occurrence, and the first machine learning model is trained using an incident and playbook database including at least: a first incident and a corresponding first playbook, where the first incident includes at least a first occurrence and a second occurrence and the first playbook includes at least a first action and a second action; and a second incident and a corresponding second playbook, where the second incident includes at least a third occurrence and a fourth occurrence and the second playbook includes at least a third action and a fourth action.

The non-transitory computer readable medium further has stored therein instructions that when executed by the processing resource cause the processing resource to: assemble an action vector, wherein the action vector includes at least the first action, the second action, the third action, and the fourth action; apply a second machine learning model to a combination of the occurrence vector and the action vector to yield one or more actions, where the second machine learning model is trained using the incident and playbook database; and apply a subset of the one or more actions to address an incident corresponding to the occurrences in the vector of occurrences.

Yet other embodiments provide non-transitory computer-readable storage media embodying a set of instructions, which when executed by a processing resource, causes the processing resource to: apply a first machine learning model to an occurrence vector to yield one or more playbooks. The occurrence vector includes at least a first occurrence and a second occurrence, and the first machine learning model is trained using an incident and playbook database including at least: a first incident and a corresponding first playbook, where the first incident includes at least a first occurrence and a second occurrence and the first playbook includes at least a first action and a second action; and a second incident and a corresponding second playbook, where the second incident includes at least a third occurrence and a fourth occurrence and the second playbook includes at least a third action and a fourth action.

The non-transitory computer readable medium further has stored therein instructions that when executed by the processing resource cause the processing resource to: assemble an action vector, wherein the action vector includes at least the first action, the second action, the third action, and the fourth action; apply a second machine learning model to a combination of the occurrence vector and the action vector to yield one or more actions, where the second machine learning model is trained using the incident and playbook database; and apply a subset of the one or more actions to address an incident corresponding to the occurrences in the vector of occurrences.

Figure 1A:
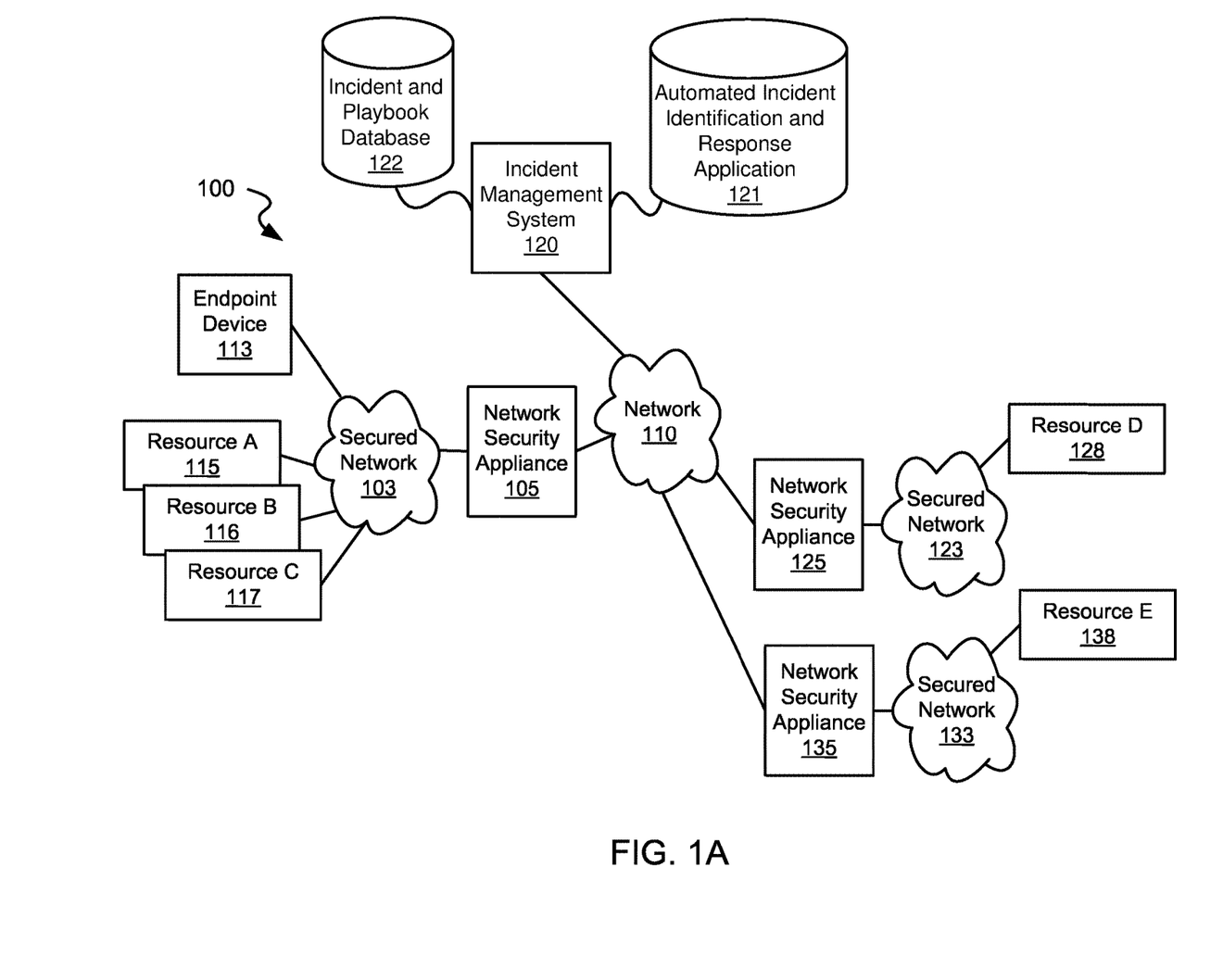
FIGS. 1A-1C illustrate a network architecture supporting automated network incident management in accordance with some embodiments.

Turning to FIG. 1A, a network architecture 100 supporting automated incident identification and response in accordance with some embodiments. As shown, network architecture 100 includes an incident management system 120 executing an automated incident identification and response application 121. Automated incident identification and response application 121 monitors network activity and automatically identifies potential incidents based upon occurrences identified as part of the monitoring. Automated incident identification and response application 121 applies a playbook machine learning model to the identified occurrences to identify one or more playbooks maintained in an incident and playbook database 122 that may be relevant to a series of occurrences. Automated incident identification and response application 121 also applies an action machine learning model to generate a series of actions for the series of occurrences, where the series of actions are derived from the one or more identified playbooks. In some embodiments, incident management system 120 is deployed apart from any specific network as shown. In other embodiments, incident management system 120 is deployed as part of a network security appliance (e.g., a network security appliance 105, a network security appliance 125, and/or a network security appliance 135) used in relation to a specific secured network.

As shown, network architecture 100 further includes a first secured network 103 providing access to an endpoint device 113, a resource A 115, a resource B 116, and a resource C 117. The aforementioned resources may be any resource accessible via a communication network and thus include, but are not limited to, a database, an application, and/or a server. Based upon the disclosure provided herein one of ordinary skill in the art will recognize a variety of resource types that can be supported in accordance with different embodiments.

Access to first secured network 103 is governed by network security appliance 105. Network security appliance 105 provides a variety of applications and/or operations designed to secure access to secured network 103. Secured network 103 may be any communication systems or collection of communication systems that provide for network communications between respective networks. Those skilled in the art will appreciate that, secured network 103 can be a wireless network, a wired network or a combination thereof that can be implemented as one of the various types of networks, such as the Internet, an Intranet, a Local Area Network (LAN), a Wide Area Network (WAN), and the like.

Network architecture 100 further includes: a second secured network 123 providing access to a resource D 128, with access controlled by network security appliance 125; a third secured network 133 providing access to a resource E 138, with access controlled by network security appliance 135. Resource D 128 and resource E 138 may be any resource accessible via a communication network and thus include, but are not limited to, a database, an application, and/or a server. Based upon the disclosure provided herein one of ordinary skill in the art will recognize a variety of resource types that can be supported in accordance with different embodiments.

Network security appliance 125 provides a variety of applications and/or operations designed to secure access to secured network 123, and network security appliance 135 provides a variety of applications and/or operations designed to secure access to secured network 133. Secured network 123 may be any communication systems or collection of communication systems that provide for network communications between respective networks; and secured network 123 may be any communication systems or collection of communication systems that provide for network communications between respective networks. Those skilled in the art will appreciate that, secured networks 123, 133 can be a wireless network, a wired network or a combination thereof that can be implemented as one of the various types of networks, such as the Internet, an Intranet, a Local Area Network (LAN), a Wide Area Network (WAN), and the like.

Figure 1B:
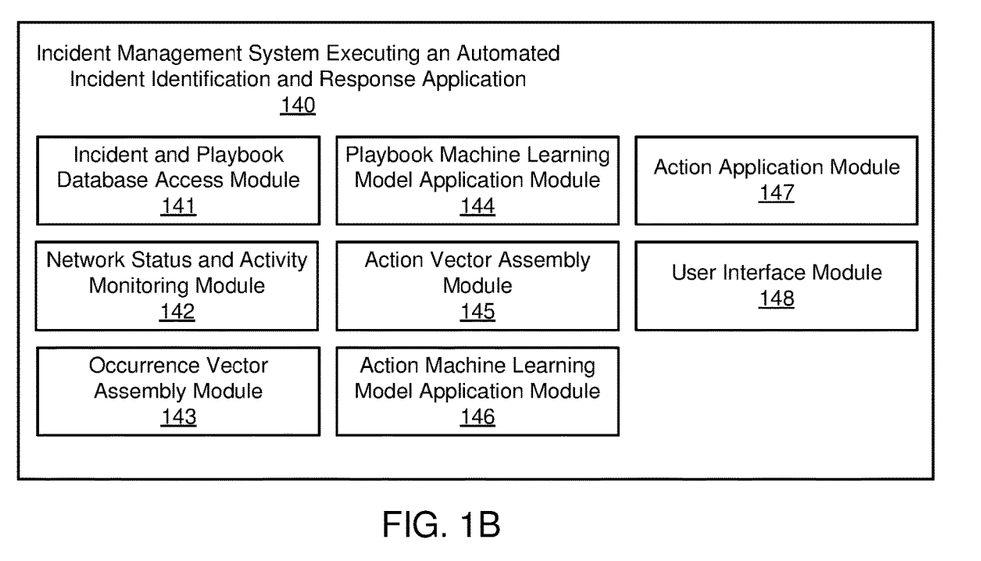

Turning to FIG. 1B, an implementation of an incident management system executing an automated incident identification and response application 140 is shown in accordance with some embodiments. In this embodiment, incident management system executing an automated incident identification and response application 140 includes an incident and playbook database access module 141, a network status and activity monitoring module 142, an occurrence vector assembly module 143, a playbook machine learning model application model 144, an action vector assembly module 145, an action machine learning model application module 146, an action application module 147, and a user interface module 148.

Incident and playbook database access module 141 is configured to access existing combinations of incidents and corresponding playbooks from incident and playbook database 122. Incident and playbook database access module 141 is further configured to update incident and playbook database 122 to include combinations of new incidents and playbooks that are automatically generated using other modules of incident management system executing an automated incident identification and response application 140.

Network status and activity monitoring module 142 is configured to monitor defined aspects of network operation including, but not limited to, network traffic occurrences, device status occurrences, network rules violation occurrence, and/or the like. As just some more specific examples, such occurrences may include, but are not limited to, a device status occurrence of a security software of an accessing device being out of date, network traffic occurrence of an increase in network activity, or a network rules violation occurrence of a network transaction including a known malicious signature or an access to a prohibited address. Based upon the disclosure provided herein, one of ordinary skill in the art will recognize a variety of occurrences that may be monitored in accordance with different embodiments.

Occurrence vector assembly module 143 is configured to assemble identified occurrences into an occurrence vector. In some embodiments, the occurrence vector includes the most recent six occurrences. Based upon the disclosure provided herein, one of ordinary skill in the art will recognize a variety of different numbers of occurrences that may be incorporated into the occurrence vector Playbook machine learning model application model 144 is configured to apply a trained machine learning model to the occurrence vector to identify any playbooks from incident and playbook database 122 that are reasonably likely to be applicable to the occurrences in the occurrence vector. In some embodiments, the playbook machine learning model relies upon a similarity model that operates to determine similarity between the occurrence vector and occurrences from incidents in the database. Based upon the disclosure provided herein, one of ordinary skill in the art will recognize a number of similarities models and/or architectures that may be used in accordance with different embodiments. Playbook machine learning model application model 144 is further configured to apply the actions of an identified playbook where only one playbook is identified that is reasonably likely to be applicable to the occurrences.

Action vector assembly module 145 is configured to assemble the actions from two or more playbooks where the playbook machine learning model identified two or more playbooks that are reasonably likely to be applicable to the occurrences in the occurrence vector. Additionally, action vector assembly module 145 removes duplicate actions from the action vector such that the resulting action vector may include any number of actions but only one instance of any given action.

Action machine learning model application module 146 is configured to receive both an available action vector and a corresponding occurrence vector. The action machine learning model has been trained to select the most likely actions based upon the combination of the action vector and the occurrence vector. Based upon the disclosure provided herein, one of ordinary skill in the art will recognize a number of machine learning model types and/or architectures that may be used in accordance with different embodiments.

Action application module 147 is configured to perform actions from either a single playbook that was identified by playbook machine learning model application model 144, or actions from an action vector from action vector assembly module 145.

User interface module 148 is configured to present occurrences and corresponding actions to a user with a query as to whether to proceed, and to request feedback from a user as to whether application of actions were effective.

Figure 1C:
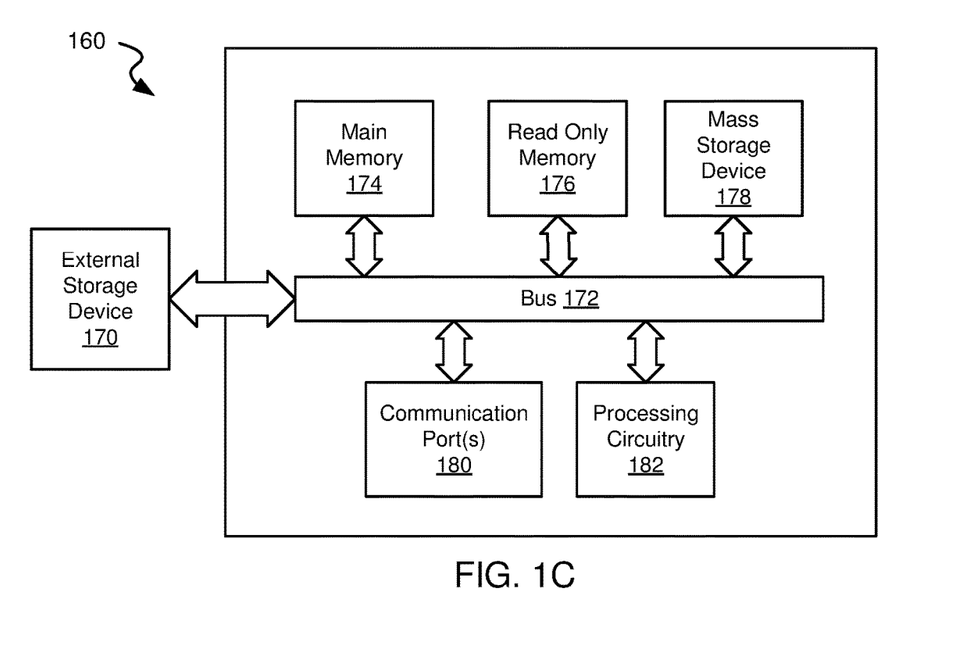

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of security orchestration system 120, network security appliance 115, one or more computers on which applications A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2A:
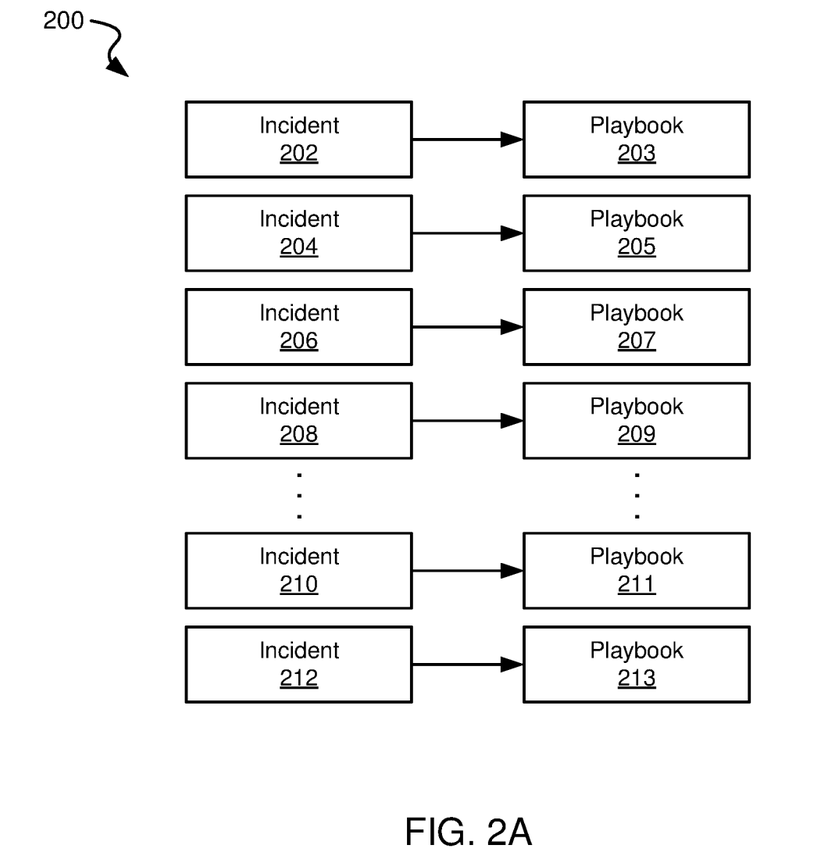
FIGS. 2A-2C show an example database of incidents and corresponding playbooks that may be utilized and updated using approaches in accordance with various embodiments.

Turning to FIG. 2A, an example database 200 of incidents and corresponding playbooks that may be utilized and updated using approaches in accordance with various embodiments. As shown, database 200 includes a number of incidents 202, 204, 206, 208, 210 that were previously identified either automatically or by a human operator. In some embodiments, a database may include hundreds to tens of thousands of incidents.

Each of the incidents 202, 204, 206, 208, 210 has a corresponding playbook (e.g., a playbook 203 corresponding to incident 202, a playbook 205 corresponding to incident 204, a playbook 207 corresponding to incident 206, a playbook 209 corresponding to incident 208, and a playbook 211 corresponding to incident 210). The aforementioned playbooks include a response developed in relation to the respective incident. Thus, for example, when incident 202 was identified, playbook 203 was developed to address incident 202. These playbooks may have been developed by a human operator or automatically.

Each of incidents 202, 204, 206, 208, 210 includes one or more occurrences. Such occurrences may include, but are not limited to, network traffic occurrences, device status occurrences, network rules violation occurrence, or the like. As just some more specific examples, such occurrences may include, but are not limited to, a device status occurrence of a security software of an accessing device being out of date, network traffic occurrence of an increase in network activity, or a network rules violation occurrence of a network transaction including a known malicious signature or an access to a prohibited address. Based upon the disclosure provided herein, one of ordinary skill in the art will recognize a variety of network status and activity information that may be considered an occurrence in accordance with different embodiments.

Figure 2B:
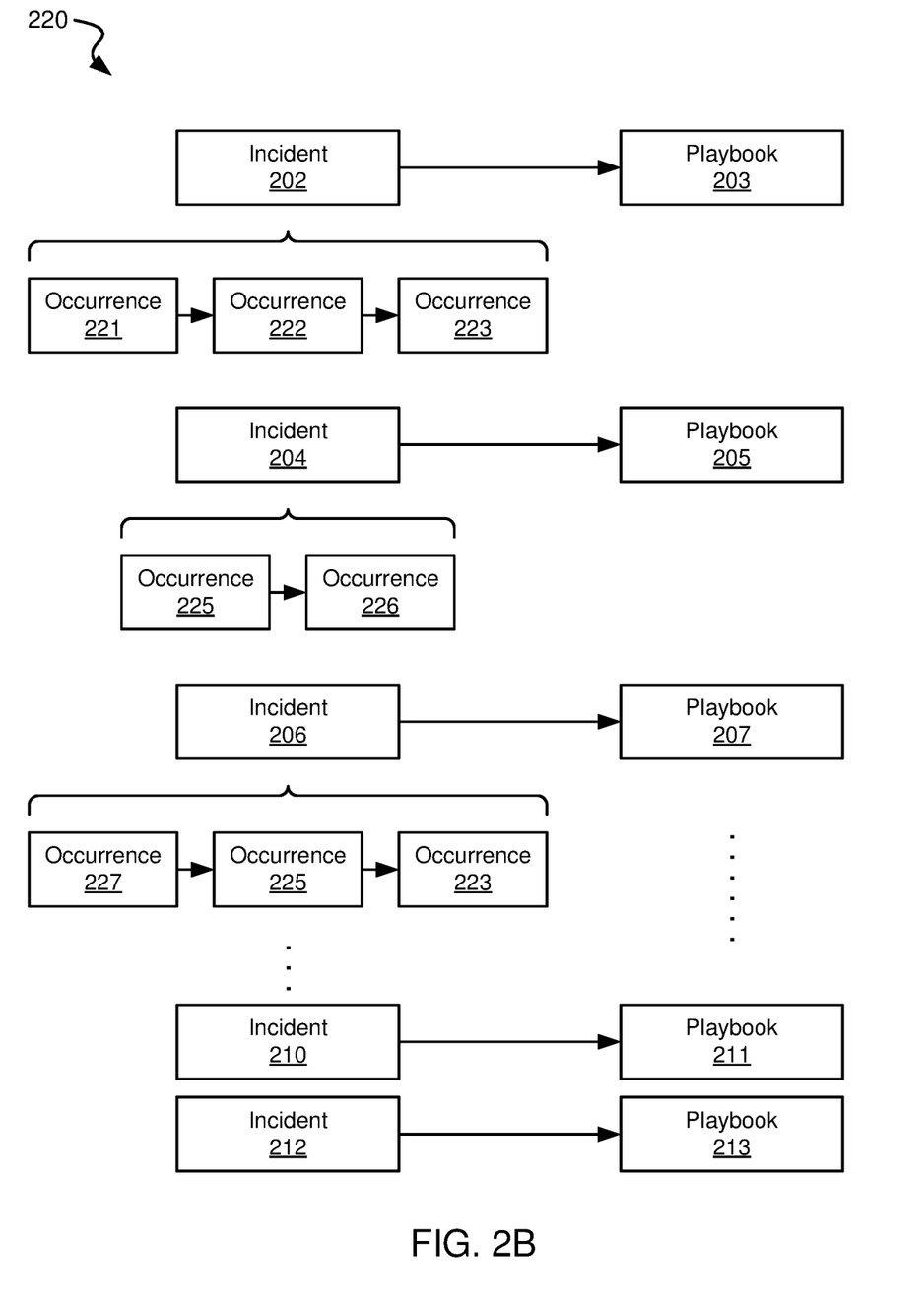

Turning to FIG. 2B, a graphical depiction 220 shows database 200 with incidents expanded to illustrate the individual occurrences that form the respective incident. In particular, incident 202 is shown as being formed by a combination of an occurrence 221 followed by an occurrence 222, which in turn is followed by an occurrence 223. Similarly, incident 204 is shown as being formed by a combination of an occurrence 225 followed by an occurrence 226; and incident 206 is shown as being formed by a combination of an occurrence 227 followed by occurrence 225, which in turn is followed by an occurrence 223. Of note, individual occurrences may be found in one or more incidents.

Each of playbooks 203, 205, 207, 209, 211 includes one or more actions. Such actions may include, but are not limited to, device modification actions, network preclusion actions, or network modification actions. As just some more specific examples, such actions may include, but are not limited to, a device modification action of an update of a software package executing on the device, a network preclusion action of stopping access to network resources by an identified device, or a network modification action of updating a list of identified malicious actors. Based upon the disclosure provided herein, one of ordinary skill in the art will recognize a variety of network and/or device actions that may be considered an action in accordance with different embodiments.

Figure 2C:
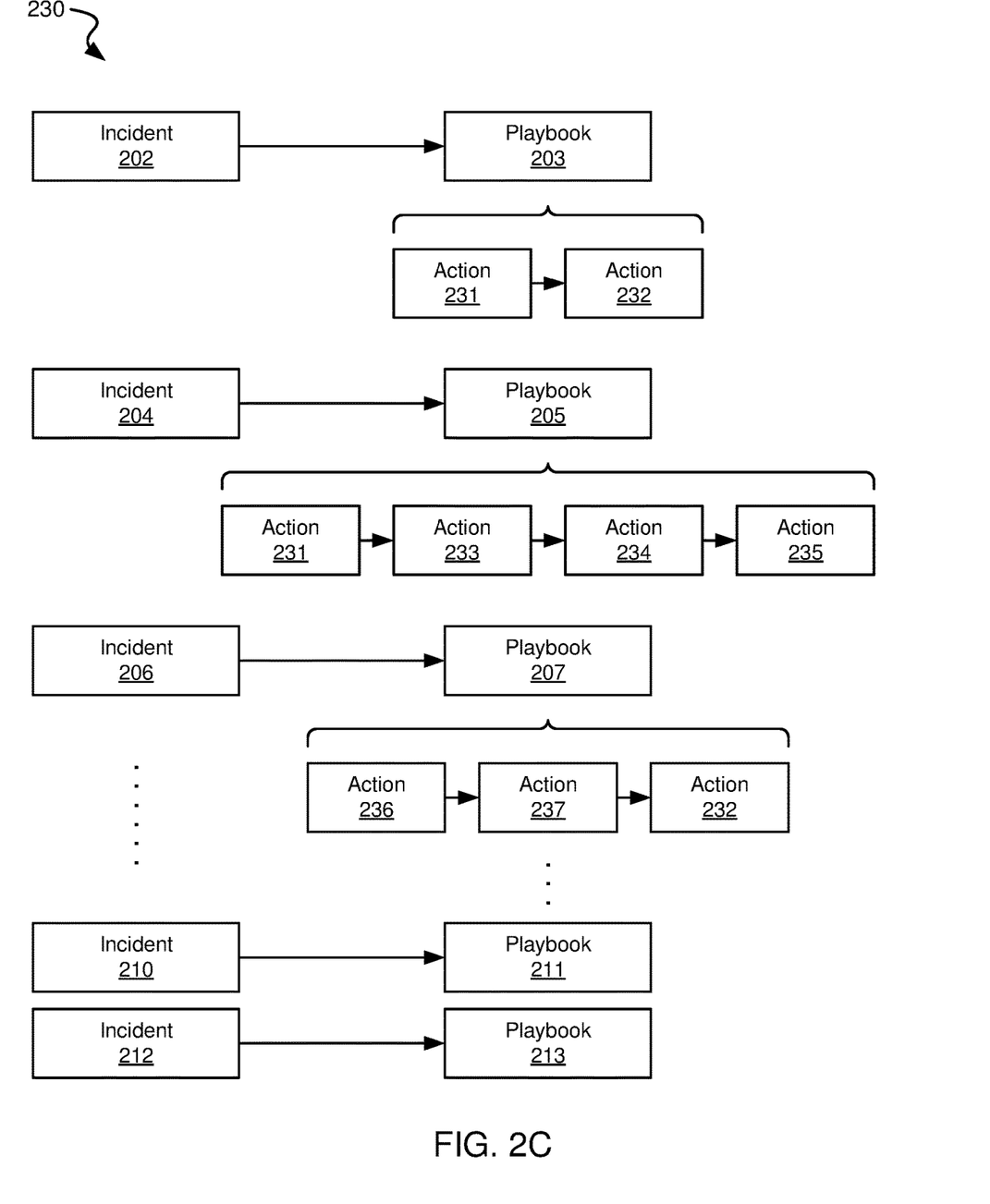

Turning to FIG. 2C, a graphical depiction 230 shows database 200 with playbooks expanded to illustrate the individual actions that form the respective playbook. In particular, playbook 203 is shown as being formed by a combination of an action 231 followed by an action 232. Similarly, playbook 205 is shown as being formed by a combination of action 231, followed by an action 233, which is followed by an action 234, which is followed by an action 234; and playbook 207 is shown as being formed by a combination of an action 236 followed by an action 237, which is followed by action 232. Of note, individual actions may be found in one or more playbooks.

Figure 3:
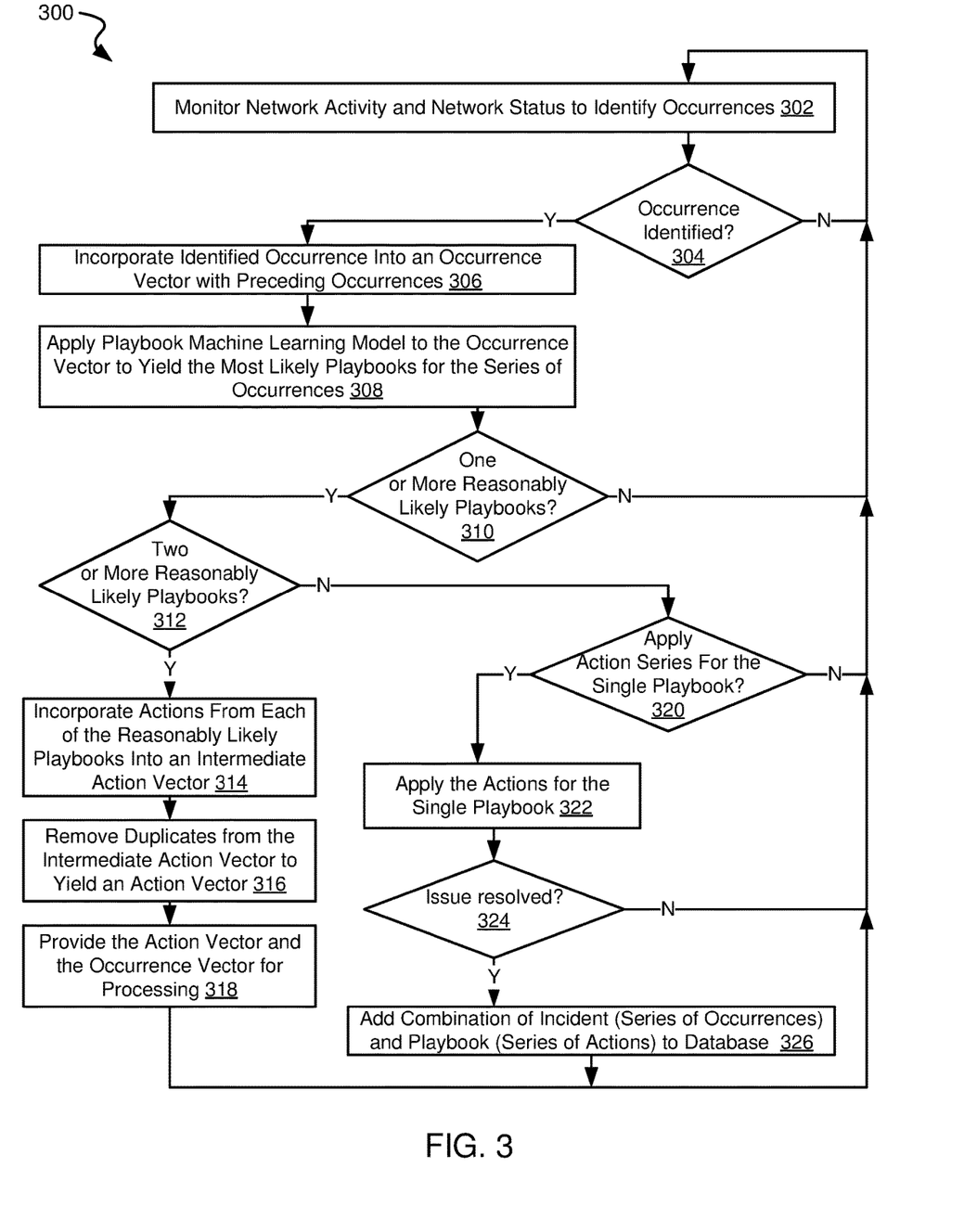
FIG. 3 is a flow diagram showing a method in accordance with some embodiments for applying a playbook machine learning model to a vector of occurrences to generate a vector of actions in the case of multiple applicable playbooks or applying the actions of a playbook in the case of a single applicable playbook in accordance with various embodiments.

Turning to FIG. 3, a flow diagram 300 shows a method in accordance with some embodiments for applying a playbook machine learning model to a vector of occurrences to generate a vector of actions in the case of multiple applicable playbooks or applying the actions of a playbook in the case of a single applicable playbook in accordance with various embodiments. Following flow diagram 300, network activity and network status are monitored to identify individual occurrences (block 302). The network activity and network status monitoring can monitor any aspect of network operation including, but not limited to, network traffic occurrences, device status occurrences, network rules violation occurrence, or the like. As just some more specific examples, such occurrences may include, but are not limited to, a device status occurrence of a security software of an accessing device being out of date, network traffic occurrence of an increase in network activity, or a network rules violation occurrence of a network transaction including a known malicious signature or an access to a prohibited address. Based upon the disclosure provided herein, one of ordinary skill in the art will recognize a variety of occurrences that may be monitored in accordance with different embodiments.

Where an occurrence is identified (block 304), the identified occurrence is incorporated into an occurrence vector along with preceding occurrences (block 306). In some embodiments, the occurrence vector includes the most recent six occurrences. Based upon the disclosure provided herein, one of ordinary skill in the art will recognize a variety of different numbers of occurrences that may be incorporated into the occurrence vector.

The occurrence vector is provided to a playbook machine learning model that has been trained to select the most likely playbooks based upon the occurrence vector (block 308). In particular, the playbook machine learning model is applied to the occurrence vector to identify one or more playbooks from a database having incidents and corresponding playbooks where the identified playbooks are those that are most likely to be applicable to the occurrences. In some embodiments, the playbook machine learning model relies upon a similarity model that operates to determine similarity between the occurrence vector and occurrences from incidents in the database. Based upon the disclosure provided herein, one of ordinary skill in the art will recognize a number of similarities models and/or architectures that may be used in accordance with different embodiments.

Where the playbook machine learning model does not return any playbooks that are reasonably likely to be applicable to the occurrences in the occurrence vector (block 310), no more actions are taken and the process continues with monitoring network activity and status (block 302). As used herein, a playbook is considered "reasonably likely to be applicable" where a likelihood value returned by the playbook machine learning model exceeds a defined threshold. In some embodiments, a playbook that is reasonably likely to be applicable to the occurrences in the occurrence vector is determined by comparing the similarity between a given incident/playbook combination with a threshold value. In some embodiments, the threshold value is user programmable.

Alternatively, where the playbook machine learning model finds at least one playbook that is reasonably likely to be applicable to the occurrences in the occurrence vector (block 310), it is determined whether there are more than one playbook (block 312). Where there is only one playbook that is reasonably likely to be applicable to the occurrences in the occurrence vector (block 312), a request to a human operator is provided via a user interface asking the human operator if they would like to apply the actions corresponding to the single playbook identified by the playbook machine learning model (block 320). Where the human operator declines to apply the actions (block 320), no more actions are taken and the process continues with monitoring network activity and status (block 302).

Alternatively, where the human operator agrees to apply the actions (block 320), the actions included in the single identified playbook are applied (block 322). The human operator is then asked if the issue indicated by the occurrences were resolved (i.e., were the actions successful) (block 324). Where they were successful (block 324), the combination of an incident including the occurrences from the occurrence vector and the single identified playbook are stored to the database for use and/or consideration in the future (block 326).

Figure 4:
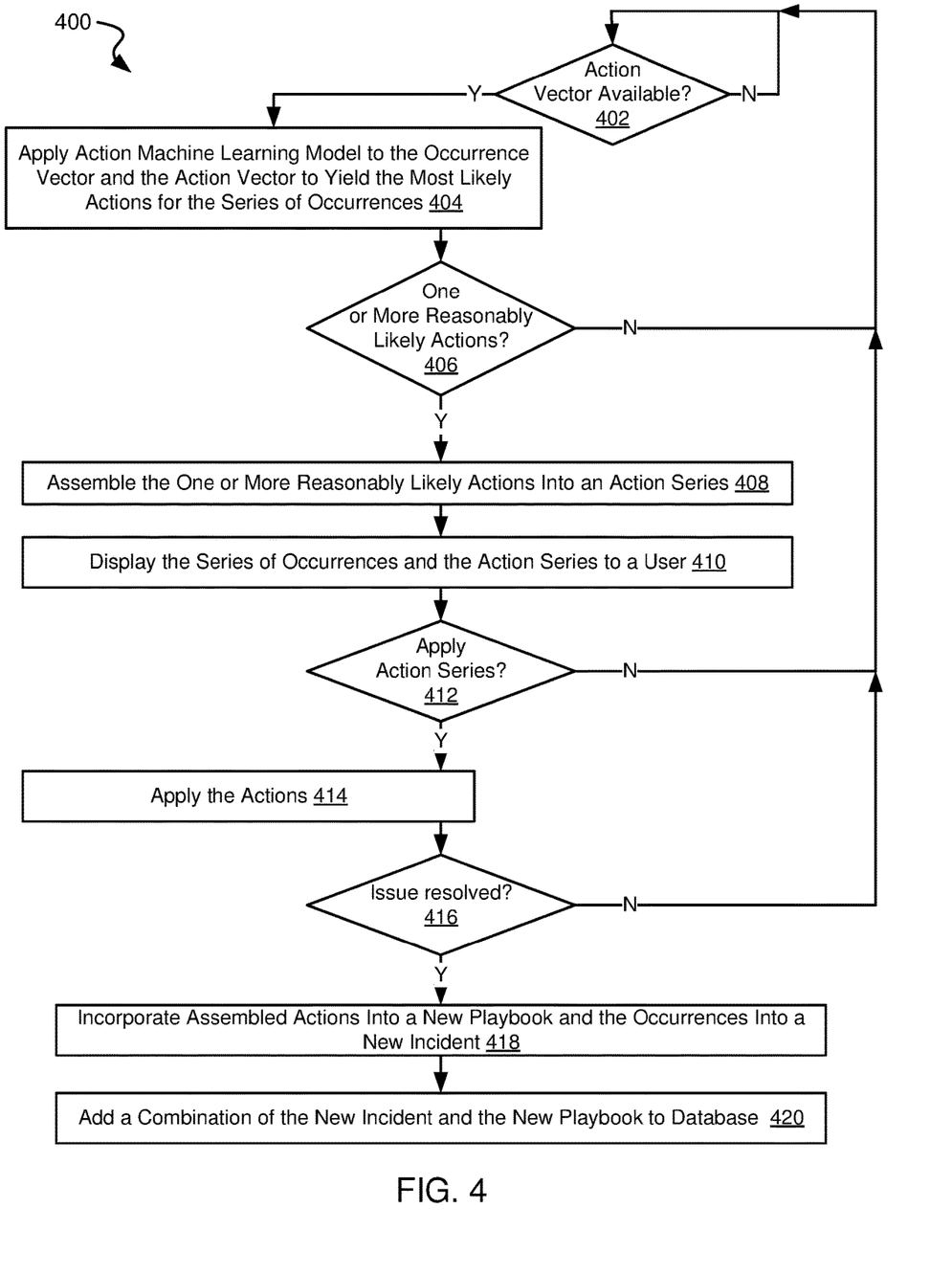
FIG. 4 is a flow diagram showing a method in accordance with some embodiments for applying an action machine learning model to a vector of occurrences and a vector of actions to yield a series of actions corresponding to the vector of occurrences in accordance with one or more embodiments.

Alternatively, where two or more playbooks are identified by the playbook machine learning model as being reasonably likely to be applicable the actions from all of the identified playbooks are incorporated into an intermediate action vector (block 314). Duplicated actions are removed from the intermediate action vector to yield an action vector including a number of actions but only one instance of any given action (block 316). This action vector and the occurrence vector are provided for further processing (block 318). Such further processing is designed to create a new playbook that includes one or more actions from the action vector. FIG. 4 discusses one embodiment for automated generation of a playbook based upon the action vector.

Turning to FIG. 4, a flow diagram 400 shows a method in accordance with some embodiments for applying an action machine learning model to a vector of occurrences and a vector of actions to yield a series of actions corresponding to the vector of occurrences in accordance with one or more embodiments. Following flow diagram 400, it is determined whether an action vector is available for processing (block 402). Such an action vector may be that generated as part of the method discussed above in relation to FIG. 3. As set forth above, an action vector is generated when two or more playbooks are identified that are each reasonably likely to be applicable to an incident including occurrences in an occurrence vector.

When an action vector is available for processing (block 402), both the available action vector and the corresponding occurrence vector are provided to an action machine learning model that has been trained to select the most likely actions based upon the combination of the action vector and the occurrence vector (block 404). In particular, the action machine learning model is applied to the combination of the action vector and the occurrence vector to identify one or more actions that are most likely to be applicable to the occurrences. Based upon the disclosure provided herein, one of ordinary skill in the art will recognize a number of machine learning model types and/or architectures that may be used in accordance with different embodiments.

It is determined whether the action machine learning model yielded one or more actions that are reasonably likely to be applicable to the occurrences in the occurrence vector (block 406 As used herein, an action is considered "reasonably likely to be applicable" where a likelihood value returned by the action machine learning model exceeds a defined threshold. In some embodiments, the threshold value is user programmable. Where no actions are identified by the action machine learning model as reasonably likely to be applicable (block 406), no more actions are taken and the process continues with awaiting another action vector (block 402).

Alternatively, where one or more actions are identified by the action machine learning model as reasonably likely to be applicable (block 406), the one or more actions are assembled in to an action series (block 408). The series of actions along with the series of occurrences from the occurrence vector are displayed to a human operator via a user interface (block 410), and a request is made to a human operator via the user interface asking the human operator if they would like to apply the assembled actions generated by the action machine learning model (block 412). Where the human operator declines to apply the actions (block 412), no more actions are taken and the process continues with awaiting another action vector (block 402).

Alternatively, where the human operator agrees to apply the actions (block 412), the assembled actions are applied (block 414). The human operator is then asked if the issue indicated by the occurrences were resolved (i.e., were the actions successful) (block 416). Where they were successful (block 416), the assembled actions are formed into a new playbook and the occurrences from the occurrence vector are assembled into a new incident (block 418). The combination of the new incident and the corresponding new playbook are added to the database for use in the future (block 420).

In conclusion, the present disclosure provides for novel systems, devices, and methods. While detailed descriptions of one or more embodiments have been given above, various alternatives, modifications, and equivalents will be apparent to those skilled in the art. Therefore, the above description should not be taken as limiting the scope of the invention, which is defined by the appended claims.

What is claimed is:

1. A method for automatically generating playbooks in a networking environment, the method comprising:
    applying, by a processing resource of a network security appliance, a first machine learning model to an occurrence vector to yield one or more playbooks, wherein the occurrence vector includes at least a first occurrence and a second occurrence, and wherein the first machine learning model is trained using an incident and playbook database including at least:
        a first incident and a corresponding first playbook, wherein the first incident includes at least a first occurrence and a second occurrence and the first playbook includes at least a first action and a second action;
        a second incident and a corresponding second playbook, wherein the second incident includes at least a third occurrence and a fourth occurrence and the second playbook includes at least a third action and a fourth action;
    assembling, by the processing resource of the network security appliance, an action vector, wherein the action vector includes at least the first action, the second action, the third action, and the fourth action;
    applying, by the processing resource of the network security appliance, a second machine learning model to a combination of the occurrence vector and the action vector to yield one or more actions, wherein the second machine learning model is trained using the incident and playbook database; and
    applying, by the processing resource of the network security appliance, a subset of the one or more actions to address an incident corresponding to the occurrences in the vector of occurrences.

2. The method of claim 1, wherein including the first action, the second action, the third action, and the fourth action in the action vector is based at least in part on the first machine learning model indicating that both the first playbook and the second playbook are reasonably likely to be applicable to the occurrences in the occurrence vector.

3. The method of claim 1, the method further comprising:
    comparing, by the processing resource, a likelihood that the first playbook is applicable to the occurrences in the occurrence vector to a threshold value;
    comparing, by the processing resource, a likelihood that the second playbook is applicable to the occurrences in the occurrence vector to the threshold value; and
    wherein including the first action, the second action, the third action, and the fourth action in the action vector is based at least in part on the likelihood that: the first playbook is applicable to the occurrences in the occurrence vector is greater than the threshold value, and the second playbook is applicable to the occurrences in the occurrence vector is greater than the threshold value.

4. The method of claim 1, the method further comprising:
    monitoring, by the processing resource, some combination of network activity, network status, and device status to identify the first occurrence and the second occurrence.

5. The method of claim 4, the method further comprising:
    assembling, by the processing resource, the first occurrence and the second occurrence into the occurrence vector.

6. The method of claim 1, the method further comprising:

removing, by the processing resource prior to applying the second machine learning model, at least one action from the action vector where the at least one action is a duplicate of another action in the action vector.

7. The method of claim 1, the method further comprising:
querying, via a user interface of the processing resource, a human user about the result of applying the subset of the one or more actions.

8. The method of claim 7, the method further comprising:
creating, by the processing resource, a new incident from the occurrences in the occurrence vector and a new playbook including the subset of the one or more actions; and
updating, by the processing resource, the incident and playbook database to include the new incident and the corresponding new playbook.

9. The method of claim 1, wherein the first action is selected from a group consisting of: a device modification action, a network preclusion action, and a network modification action.

10. The method of claim 1, wherein the first occurrence is selected from a group consisting of: a network traffic occurrence, a device status occurrence, and a network rules violation occurrence.

11. A system for providing access to virtual resources in a network environment, the system comprising:
a processing resource of a network security appliance;
a non-transitory computer-readable medium, coupled to the processing resource, having stored therein instructions that when executed by the processing resource cause the processing resource to:
apply a first machine learning model to an occurrence vector to yield one or more playbooks, wherein the occurrence vector includes at least a first occurrence and a second occurrence, and wherein the first machine learning model is trained using an incident and playbook database including at least:
a first incident and a corresponding first playbook, wherein the first incident includes at least a first occurrence and a second occurrence and the first playbook includes at least a first action and a second action;
a second incident and a corresponding second playbook, wherein the second incident includes at least a third occurrence and a fourth occurrence and the second playbook includes at least a third action and a fourth action;
assemble an action vector, wherein the action vector includes at least the first action, the second action, the third action, and the fourth action;
apply a second machine learning model to a combination of the occurrence vector and the action vector to yield one or more actions, wherein the second machine learning model is trained using the incident and playbook database; and
apply a subset of the one or more actions to address an incident corresponding to the occurrences in the vector of occurrences.

12. The system of claim 11, wherein including the first action, the second action, the third action, and the fourth action in the action vector is based at least in part on the first machine learning model indicating that both the first playbook and the second playbook are reasonably likely to be applicable to the occurrences in the occurrence vector.

13. The system of claim 11, wherein the non-transitory computer-readable medium further has stored therein instructions that when executed by the processing resource cause the processing resource to:
compare a likelihood that the first playbook is applicable to the occurrences in the occurrence vector to a threshold value;
compare a likelihood that the second playbook is applicable to the occurrences in the occurrence vector to the threshold value; and
wherein including the first action, the second action, the third action, and the fourth action in the action vector is based at least in part on the likelihood that: the first playbook is applicable to the occurrences in the occurrence vector is greater than the threshold value, and the second playbook is applicable to the occurrences in the occurrence vector is greater than the threshold value.

14. The system of claim 11, wherein the non-transitory computer-readable medium further has stored therein instructions that when executed by the processing resource cause the processing resource to monitor some combination of network activity, network status, and device status to identify the first occurrence and the second occurrence.

15. The system of claim 14, wherein the non-transitory computer-readable medium further has stored therein instructions that when executed by the processing resource cause the processing resource to assemble the first occurrence and the second occurrence into the occurrence vector.

16. The system of claim 11, wherein the non-transitory computer-readable medium further has stored therein instructions that when executed by the processing resource cause the processing resource to remove, prior to applying the second machine learning model, at least one action from the action vector where the at least one action is a duplicate of another action in the action vector.

17. The system of claim 11, wherein the non-transitory computer-readable medium further has stored therein instructions that when executed by the processing resource cause the processing resource to query, via a user interface of the processing resource, a human user about the result of applying the subset of the one or more actions.

18. The system of claim 17, wherein the non-transitory computer-readable medium further has stored therein instructions that when executed by the processing resource cause the processing resource to:
create a new incident from the occurrences in the occurrence vector and a new playbook including the subset of the one or more actions; and
update the incident and playbook database to include the new incident and the corresponding new playbook.

19. A non-transitory computer-readable storage medium embodying a set of instructions, which when executed by a processing resource of a network security appliance, causes the processing resource to:
apply a first machine learning model to an occurrence vector to yield one or more playbooks, wherein the occurrence vector includes at least a first occurrence and a second occurrence, and wherein the first machine learning model is trained using an incident and playbook database including at least:
a first incident and a corresponding first playbook, wherein the first incident includes at least a first occurrence and a second occurrence and the first playbook includes at least a first action and a second action;
a second incident and a corresponding second playbook, wherein the second incident includes at least a third occurrence and a fourth occurrence and the second playbook includes at least a third action and a fourth action;

assemble an action vector, wherein the action vector includes at least the first action, the second action, the third action, and the fourth action;

apply a second machine learning model to a combination of the occurrence vector and the action vector to yield one or more actions, wherein the second machine learning model is trained using the incident and playbook database; and apply, with network security appliance a subset of the one or more actions to address an incident corresponding to the occurrences in the vector of occurrences.

20. The non-transitory computer-readable storage medium of claim 19, wherein the first action is selected from a group consisting of: a device modification action, a network preclusion action, and a network modification action; and wherein the first occurrence is selected from a group consisting of: a network traffic occurrence, a device status occurrence, and a network rules violation occurrence.

* * * * *